United States Patent [19]
Stites, III

[11] Patent Number: 5,327,506
[45] Date of Patent: Jul. 5, 1994

[54] VOICE TRANSMISSION SYSTEM AND METHOD FOR HIGH AMBIENT NOISE CONDITIONS

[76] Inventor: George M. Stites, III, 1715 Shore Rd., Linwood, N.J. 08221

[21] Appl. No.: 55,378

[22] Filed: May 3, 1993

Related U.S. Application Data

[63] Continuation-in-part of Ser. No. 504,971, Apr. 5, 1990, Pat. No. 5,208,867.

[51] Int. Cl.$^5$ .............................................. H04R 25/00
[52] U.S. Cl. ..................................... 381/169; 381/71; 381/94
[58] Field of Search ................... 381/94, 72, 71, 151, 381/169

[56] References Cited

U.S. PATENT DOCUMENTS

| | | | |
|---|---|---|---|
| 4,654,871 | 3/1987 | Chaplin et al. | 381/94 |
| 5,134,659 | 7/1992 | Moseley | 381/72 |

Primary Examiner—Curtis Kuntz
Assistant Examiner—Sinh Tran
Attorney, Agent, or Firm—Neil F. Markva

[57] ABSTRACT

An earpiece has a structural configuration effective to removably interlock its outer surface contiguously to the outer ear auricle of the earpiece wearer. A microphone substantially exclusively receives, from the air of the external auditory canal, outbound voice sounds caused by the reverse modulation of the tympanic membrane when the earpiece wearer speaks. An outbound audio circuit is electrically connected to the microphone which converts the outbound voice sounds to electrical voice signals. The outbound audio circuit amplifies the outbound electrical voice signals to a preselected fixed level output gain and removes noise from the voice signals. Specific features of the invention are directed to a two-way communication system, the structure of a speaker/microphone module, the structural configuration of an earpiece assembly, specific control circuitry, and a particular assembly for conducting a method of communicating voice sounds substantially exclusively from the air of the external auditory canal while substantially eliminating audio vibration pickup of sound signals by bone conduction. The voice transmission system and method effect intelligible voice communication in an environment having ambient noise at a level greater than 90 decibels.

19 Claims, 9 Drawing Sheets

VOICE TRANSMISSION SYSTEM AND METHOD FOR HIGH AMBIENT NOISE CONDITIONS

RELATED APPLICATION

This is a continuation-in-part of application Ser. No. 07/504,971, filed Apr. 5, 1990, U.S. Pat. No. 5,208,867.

FIELD OF THE INVENTION

This invention relates to transmitting and receiving voice sounds through the external auditory ear canal under high ambient noise conditions. More particularly, the invention relates to a voice transmission system and method for effecting communication through the external auditory ear canal of a person within an environment having an ambient noise level of greater than 90 decibels.

BACKGROUND OF THE INVENTION

Numerous attempts have been made to provide voice communication within environments having a high ambient noise level. Particularly, it has been desirable to provide a system in high ambient noise conditions as found in aviation, competitive motor sports such as racing cars and boats, industrial plants, crowd noise, public safety and military operations.

Known voice transmission systems designed for high ambient noise conditions generally operate on the principle of audio vibration pickup of sound signals by bone and tissue conduction through the head of a person wearing an earpiece. U.S. Pat. No. 4,150,262 shows a typical voice transmission system having an earpiece formed to fit into the external auditory canal. The earpiece structure is hard and closely contacts the external auditory canal wall to enhance the capability of transmitting sound vibrations from the surrounding bone structure. A piezo element mounted inside the earpiece vibrates when the user utters voice sounds causing the bone structure to vibrate. In some embodiments, the air within the external auditory canal between the earpiece and the tympanic membrane is allowed to escape thereby reducing the effect of physically blocking the external auditory canal. No attempt is made to obtain voice sounds from the air within the auditory canal.

U.S. Pat. No. 4,588,867 discloses an ear microphone comprising a pickup piece having a vibration/electrical signal converter element. The pickup piece and a support body are composed of a rigid material having a large mass to enhance the pickup of sound vibrations through bone and tissue conduction. The large mass rigid member is combined with resilient material in an effort to reduce noise generated by external vibrations on the ear microphone. The principle of voice communication used in U.S. Pat. Nos. 4,150,262 and 4,588,867 depends upon audio vibration pickup via bone and tissue conduction. Therefore, it is virtually impossible for these prior art devices to be used under ambient conditions where the noise levels are greater than 90 decibels.

U.S. Pat. No. 2,938,083 shows an earpiece disposed at the opening of the external auditory canal while the speaker and amplifier system is located outside the earpiece member. The system delivers inbound sound through the earpiece to the tympanic membrane but does not handle outbound voice sounds. This system does not address use in a high ambient noise environment, and therefore is not designed for such use.

The in-ear hearing aid disclosed in U.S. Pat. No. 2,987,584 includes a canal extension section having a structural configuration for maintaining the earpiece in position without slipping or using exterior clamps for holding the unit to the ear. A plastic sound tube extends through the center of the canal extension section for delivering inbound voice sounds in accordance with standard hearing aid technology. No outbound voice transmission is possible with this known device under high ambient noise conditions.

Re. Pat. No. 26,174 discloses a hearing aid earpiece structure that fits the outer ear and a portion of the auditory canal. The earpiece has self-contained electronic control circuitry. An electro-formed metal housing has an auditory canal extension providing an effective seal to facilitate the inbound transmission of sound within the auditory canal both by air conduction and the audio vibration pickup of sound by bone conduction. Specific techniques are disclosed to enhance the degree of inbound sound transmission by bone conduction. A single flexible tube connects the inbound voice sound outlet of a speaker to an open end port disposed a space distance from the tympanic membrane of the earpiece user.

U.S. Pat. No. 2,535,063 discloses the typical commercially available two-way communication systems. Sound is sent and received through the external auditory canal to effect two-way communication. A transducer functions both as an earphone to direct inbound sound to the ear canal and as a microphone for transmitting outbound voice sounds from the ear canal to a remote location. It has been found that such commercially available systems are not capable of operating under ambient conditions with noise levels greater than 90 decibels. That is, two-way communication of a clear intelligible voice sound signal under ambient conditions with noise levels in excess of 90 decibels is not possible. With such high ambient noise conditions, the externally disposed transducer will necessarily modulate creating noise interference thereby causing the voice sound signal to become unintelligible.

U.S. Pat. No. 3,819,860 discloses an ear-borne transceiver using two audio passageways that are continuously open at all times and include a filter mechanism for eliminating background noise. This known ear-borne transceiver and circuit system enables a person to simultaneously transmit and receive through the passageways which are continuously coupled in open communication to the ear of the wearer of the device. Thus, substantially normal conversation can be effected so that the user can transmit while listening to himself by way of the receiver. This system is distinguished from the U.S. Pat. No. 2,535,063 which employs two channels which are mutually exclusive whereby the operator must either transmit or receive but cannot hear himself speak when transmitting. The structure of U.S. Pat. No. 3,819,860 is unworkable in a high ambient noise situation because of the obvious feedback problems existing where both channels are continuously open as disclosed.

U.S. Pat. No. 2,946,862 discloses an ear protector and communication equipment designed to effect sound attenuation while employing a two-way communication system incorporating a microphone and receiver located in an "earmuff" type of ear protector shell. This system is particularly designed to avoid the use of an earpiece having a structural configuration for insertion in the user's ear.

Noise free voice transmission through the external auditory canal under high ambient noise conditions at noise levels greater than about 90 decibels has heretofore been unattainable. The noise levels within the higher decibel range are known to have an exponential character. For example, at 100 decibels there is a certain noise level. At 103 decibels the noise level is about twice as great as at 100 decibels. At 106 decibels the sound pressure level is again twice that found at 103 decibels and so forth. At ambient noise levels of about 125–130 decibels, clear voice transmission through the auditory canal is new and unexpected.

The best boom microphone system using a mike located in front of the mouth is incapable of performing at a noise level or sound pressure much over about 110 decibels. Under these conditions, the boom mike will be substantially resting directly on the lips. Consequently, under such conditions as found in competitive motor sport events, the boom mike simply gets in the way because of the activity in the driver's cockpit.

With respect to the patent disclosures discussed above, at the noise levels of greater than about 90 decibels and up to about 140 decibels, the bone and tissue of the earpiece wearer would transmit external noise significant enough to render these prior art devices incapable of clear voice transmission.

PURPOSE OF THE INVENTION

A primary object of this invention is to provide a voice transmission method and assembly for transmitting a person's outgoing voice sounds caused by the reverse modulation of the tympanic membrane of a person in a high ambient noise environment.

Another object of the invention is to provide a voice transmission assembly and method for picking up outgoing voice sounds substantially exclusively from the air within the external auditory canal of a person.

Another object of the invention is to provide a voice transmission assembly and method for picking up outgoing voice sounds from an enclosed airspace within the external auditory canal of a person while substantially eliminating audio vibration pick-up of sound transmitted by bone and tissue conduction.

A further object of the invention is to convert voice sounds into electrical voice signals which are processed to amplify the voice sounds to a predetermined increased gain level and remove a noise portion of the voice sounds.

A still further object of the invention is to provide a voice transmission assembly and method for effecting two-way communication between individuals under high ambient noise conditions where noise is maintained at a level of greater than 90 decibels.

Still another object of the invention is to provide a two-way voice communication system for receiving and sending voice transmissions within the external auditory canal of a person under high ambient noise conditions.

Yet another object of the invention is to provide a voice transmission system using either a hard wire connection or a radio frequency (RF) system for effecting intelligible voice transmission under extremely high ambient noise conditions.

Still another object of the invention is to provide a unique micro-miniature microphone and speaker assembly that is highly directional and acoustically decoupled from outside noise for maintaining a clear voice transmission under ambient noise levels of greater than 90 decibels.

SUMMARY OF THE INVENTION

The assembly of the invention comprises means for picking up the outgoing voice sounds substantially exclusively from the air within the external auditory canal of a person while substantially eliminating audio vibration pickup of sound transmitted by bone conduction. The assembly is particularly useful under high ambient noise conditions.

The method of the invention comprises transmitting a person's outgoing voice sounds to a remote location substantially exclusively from the air within the external auditory canal. The outgoing voice sounds are caused by the reverse modulation of the tympanic membrane. Inbound sounds through the auditory canal enable their hearing by causing normal modulation of the tympanic membrane. The voice sounds coming from the vocal cords causes the tympanic membrane to reverse modulate. That is, the internal sounds caused by the person's voice will cause the tympanic membrane to modulate in the same fashion that inbound sounds from an external source cause the tympanic membrane to modulate under normal hearing conditions. Because the internal voice box through the eustachian tube causes the tympanic membrane to modulate, by definition, this is referred to herein as reverse modulation of the tympanic membrane.

The voice transmission method of the present invention is directed to picking up minute air pressure changes in the outer ear canal. The pressure changes are caused by the reverse modulation of the tympanic membrane substantially exclusively from the air within the external auditory canal of the person doing the speaking. Those voice sounds are converted to an electrical voice signal without a noise portion and having a preselected fixed level output gain. The resultant electrical voice signal is then directed to means for transmitting a clear voice sound of the person at a location remote from the person doing the speaking. Such transmission is effective under ambient conditions having a noise level greater than about 90 decibels and up to noise levels in the range of about 115 to 140 decibels.

More specifically, the method involves forming an enclosed air chamber within the external auditory canal contiguously adjacent the user's tympanic membrane. It has been discovered that the air pressure in the air chamber should be maintained at equilibrium with the air pressure in the inner ear. The air chamber is sealed to preclude sound from entering the auditory canal and an inner sound attenuating chamber is disposed at the entrance of the auditory canal to help substantially eliminate audio vibration pickup of sound transmitted by bone and tissue conduction. The voice sounds are directed from the air chamber into passageway means extending through the inner sound attenuating chamber to a sound inlet port of a microphone means which converts the voice sounds to electrical voice signals.

The earpiece assembly of the invention comprises a means for picking up voice sounds substantially exclusively from an air chamber within the external auditory canal of the person. In a specific embodiment, the air chamber is created between the earpiece assembly and the tympanic membrane. The earpiece assembly includes a body portion having a canal extension section projecting inwardly from the outer ear toward the tympanic membrane of the earpiece user. The outer surface of the canal extension section is spaced inwardly from the wall of the auditory canal. Annular gasket means, disposed around the canal extension member and extending to the canal wall, effectively maintains the position of the canal extension section away from the wall. Such sound gasketing avoids audio vibration pickup of sound transmitted by the canal wall. Furthermore, the gasket composition dampens any audio vibration pickup of sound through the gasket material touching the canal inner wall.

The earpiece assembly includes a sound transmitting section having a structural configuration with an outer surface to effectively, removably interlock contiguously to the outer ear auricle of the earpiece wearer for sealing against external noise. The structural configuration of the sound transmitting section is further effective to substantially eliminate audio vibration pickup of sound signals via bone and tissue conduction through the earpiece assembly. The structural configuration includes a body portion and a canal extension section projecting outwardly from the body portion into the external auditory canal of the earpiece user. The body portion is composed of a pliable material which substantially conforms to the ear surface profile of the wearer and forms a thin flexible outer shell defining an inner sound attenuating chamber.

The earpiece means includes two separate and independent sound passageway means having end ports open to respectively send and receive sounds directly to and from the tympanic membrane of the earpiece wearer. Sound is alternately transmitted through one of the passageway means while sound transmission is precluded in the other passageway means. One of the passageway means is effective, when open, to send inbound sound from speaker means to cause modulation of the tympanic membrane of the earpiece wearer. The other passageway means is effective, when open, to receive outbound voice sounds from the air chamber or space between the end ports and the tympanic membrane caused by the reverse modulation of the tympanic membrane with the wearer is speaking. In this instance, the sound passageway means directs the outbound voice sound from the air space in the auditory canal to the sound inlet port of microphone means. The two sound passageway means extend from their respective end ports through an inner sound attenuating chamber and connect to respective sound inlet and outlet ports of microphone means and speaker means.

A particular feature of the invention provides control circuit means for alternately transmitting sound through one of the sound passageway means while the other passageway means is closed to the transmission of sound. The control circuit means, speaker means and microphone means are located outside the earpiece. Means is provided for disposing the speaker means and microphone means at a location on the wearer's body away from the wearer's head.

Another feature of the invention is directed to the particular configuration of the speaker means and microphone means being structurally and electrically connected to a circuit board member to form a speaker/microphone module. The module is encapsulated in a molded rigid material or solid sound-proofing material to further limit ambient noise pickup by the system. By disposing the speaker/microphone module at a location away from the earpiece assembly, the audio vibration pickup of sounds by bone and tissue conduction is completely eliminated through the module.

Another feature is directed to earpiece means including flexible tube members having end ports at one end thereof which open outwardly from a canal extension section. Each of the tube members is connected at the other end thereof to a respective voice sound inlet of microphone means and a sound outlet of speaker means. In this configuration, two-way communication is made possible under extremely high ambient noise conditions where the voice sound is obtained substantially exclusively from the air of the auditory canal. Second speaker means and second microphone means disposed at a location remote from the earpiece wearer enable two-way communication between a person at the remote location and the earpiece user.

In a specific embodiment of the earpiece assembly, earpiece means includes a sound transmitting section secured to a sound dampening section. The sound transmitting section includes two separate and independent sound passageway means having end ports open to respectively transmit and receive sound to and from the tympanic membrane of the earpiece wearer. The sound dampening section includes an outer ear sealing surface portion composed of material conformable to fit any surface configuration. Thus, the conformable sealing surface portion contiguously interlocks with the structure of the wearer's outer ear auricle. The sound dampening section includes an external sound barrier portion contiguous to the outer ear sealing surface portion. The sound barrier portion is composed of barrier foam and has an outer barrier surface membrane. The outer ear sealing surface portion has a sealing surface membrane. The sound dampening section includes a surface recess having a shape and size sufficient to receive the sound transmitting section. A particular feature is directed to a means for removably mounting the sound transmitting section to the sound dampening section.

Control circuit means is disposed at a location remote from the earpiece means and includes inbound audio circuit means and outbound audio circuit means. The outbound audio circuit means is electrically connected to first microphone means and the inbound audio circuit means is electrically connected to first speaker means. Second speaker means disposed at a location remote from the person receives outbound voice signals from the first microphone means. Second microphone means disposed at a location remote from said person forwards inbound audio signals to the first speaker means.

A specific embodiment of the outbound audio circuit means includes amplifier means and processor means. The amplifier means is effective to amplify an intelligible audio electrical signal to a preselected fixed level output gain for producing an increased gain voice sound signal having a voice portion and a noise portion. The processor means is effective to separate the noise portion from the voice portion for producing a clear voice sound to be transmitted by the second speaker means remotely located away from the earpiece wearer.

Inbound audio circuit means is effective to send inbound electrical sound signals from remotely located second microphone means to the first speaker means which is supported on the earpiece wearer's body away from the wearer's head for forwarding inbound sounds to the external auditory canal of said wearer. The control circuit means includes switch means for alternately activating the outbound audio circuit means and inbound audio circuit means. The outbound audio circuit means is effective to receive electrical voice sound signals from microphone means which picks up outgoing voice sounds which are caused by the reverse modulation of the tympanic membrane and are transmitted substantially exclusively from the air within the external auditory canal of the wearer. The inbound audio circuit means is effective to send inbound electrical sound signals to speaker means for transmitting sound through the external auditory canal to the tympanic membrane of the earpiece wearer.

The earpiece member includes a canal extension section having open end ports and a length sufficient to dispose the open end ports at a spaced distance from the tympanic membrane to form an enclosed canal air chamber in the external auditory canal of the wearer. One of the end ports opens into a first sound passageway means to receive voice sounds produced by the reverse modulation of the tympanic membrane and transmitted through the canal air chamber. The other of said end ports opens into a second sound passageway means to send sounds through the canal air chamber to the tympanic membrane.

A specific embodiment of the amplifier means includes buffer means to produce a preselected impedance in the electrical voice signal before entering the processor means. The outbound audio circuit means includes capacitive means for removing a preselected lower frequency portion from the outbound electrical voice signal before entering amplifier means. The processor means includes a comparator for directing the faster rate of change of frequency of an electrical voice signal to the second speaker means and directing the lower rate of change of frequency of an electrical noise signal to ground.

BRIEF DESCRIPTION OF THE DRAWINGS

Other objects of this invention will appear in the following description and appended claims, reference being made to the accompanying drawings forming a part of the specification wherein like reference characters designate corresponding parts in the several views.

DETAILED DESCRIPTION OF THE INVENTION

Figure 1:
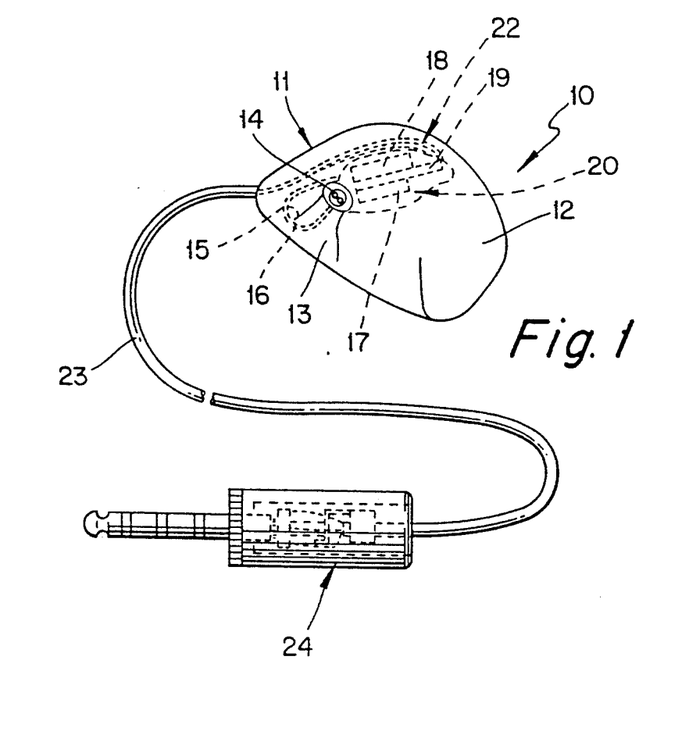
FIG. 1 is an elevational view of an earpiece assembly in accordance with this invention.

The voice transmission assembly, generally designated 10 in FIG. 1, comprises an earpiece member 11 having a body portion 12 and a canal extension section 13. End ports 14 of inbound tube 15 and outbound tube 16 open to respectively send and receive sounds to and from the tympanic membrane of the earpiece user. Inbound and outbound tubes 15 and 16 extend from end ports 14 through canal extension section 13 to respective outlet sound and inlet sound ports on speaker 18 and the unidirectional microphone 17 physically mounted to circuit board member 19.

A rigid material such as an epoxy resin encapsulates the speaker/microphone module 20 wherein microphone 17 and speaker 18 are electrically connected to circuit board member 19. Electrically connecting means 22 electrically connect plug 24 via connecting line 23. Plug 24 is a standard jack as shown and is used to electrically couple the voice transmission assembly 10 to an audio controller unit discussed below.

Figure 2:
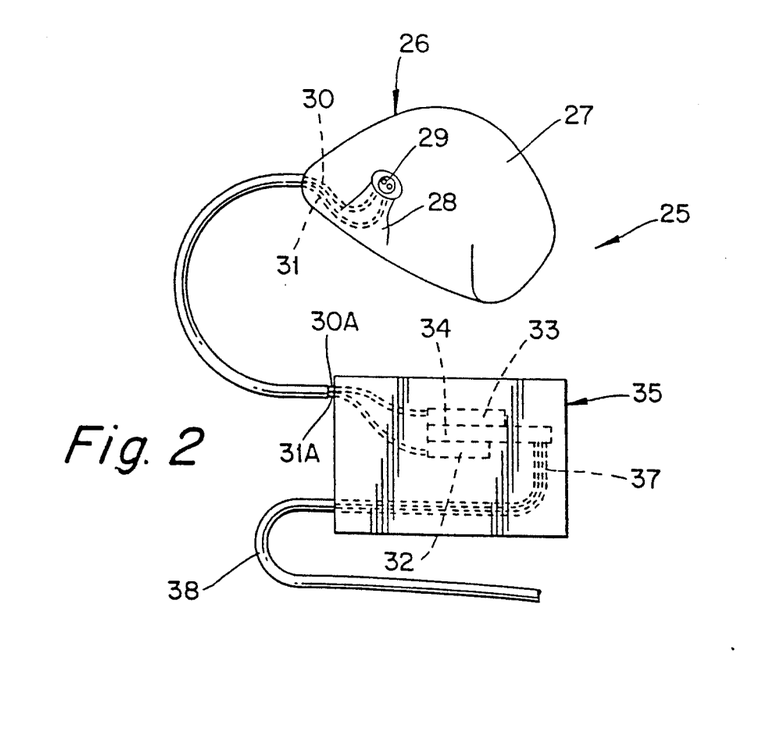
FIG. 2 is another embodiment of an earpiece assembly in accordance with this invention.

In another embodiment of the invention, an earpiece assembly, generally designated 25, comprises an earpiece member 26 having a body portion 27 and a canal extension section 28. End ports 29 of inbound tube 30 and outbound tube 31 respectively couple at the other end thereof to outlet sound port 30A and inlet sound port 31A of the speaker 33 and microphone 32. In this specific embodiment, the speaker/microphone module 35 is encased in an epoxy potting material and is disposed at a location outside the earpiece member 26. Module 35 comprises microphone 32 and speaker 33 physically coupled and electrically connected to the circuit board member 34. Electrical connecting means 37 electrically connect circuit board member 34 to a plug (not shown) via connecting line 38 as in the first embodiment discussed above.

The body portions 12 and 27 of the respective embodiments shown in FIG. 1 and FIG. 2 are composed of a flexible shell which defines an attenuating chamber through which the inbound and outbound tubes for each embodiment extend. The outer shell portion is composed of molded vinyl material and is custom-made for fitting individualized ear structures in the well known manner used to form earpieces for hearing aids.

However, the outer diameter and structure of the canal extension sections 13 and 28 of the embodiments of FIG. 1 and FIG. 2 are such that the outer surfaces thereof are spaced inwardly from the wall of the external auditory canal when the assemblies 10 and 25 are placed into the outer ear of a user. The structural configuration of earpiece members 11 and 26 have an outer surface effective to removably interlock contiguously to the outer ear auricle of an earpiece wearer. The particular structural configuration of earpiece members 11 and 26 is effective to substantially eliminate audio vibration pickup of sound transmitted via bone and tissue conduction within the head of the earpiece user.

Figure 3:
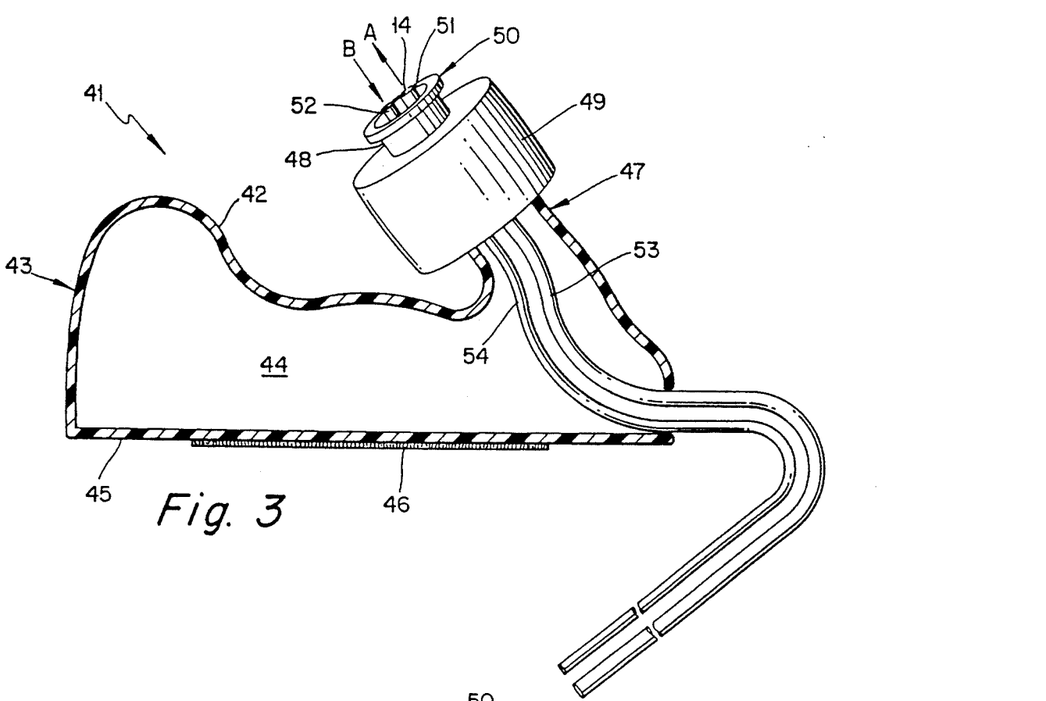
FIG. 3 is a cross-sectional view of a sound transmitting earpiece member in accordance with this invention.

The detailed structural configuration of the earpiece elements of this invention is shown in the embodiment of FIG. 3. A sound transmitting earpiece member or element 41 has a body portion 42 composed of a pliable material forming a thin, flexible outer shell 43 defining an inner attenuating chamber 44. Element 41 is first molded as a solid and then excavated to form chamber 44. A plastic material such as silicone is usable to form element 41.

A base support wall 45 of body portion 42 carries a coupling means 46 as shown. Body portion 42 includes a canal extension section 47 having a diameter to form an outer surface 48 which is spaced inwardly from the wall of the auditory canal when earpiece element 41 is removably interlocked contiguously to the wearer's outer ear auricle.

The purpose of this structural configuration is to eliminate any audio vibration pickup of sound via bone conduction within extension section 47. Annular gasket member 49 is disposed around canal extension section 47 and is composed of a sponge material which constitutes a sound vibration dampening means between the external auditory canal wall and outer surface 48 of extension section 47.

A tube retaining structure 50 at the sealed end of extension section 47 secures inbound end port 51 and outbound end port 52 for voice sound movement (Arrow A) toward the tympanic membrane while voice sound movement moves from the canal air space (Arrow B) into outbound tube 54. Tubes 53 and 54 constitute two sound passageway means wherein tube 53 is effective, when open, to transmit sound to the tympanic membrane and tube 54 is effective to receive sound from the auditory canal air space which is caused by reverse modulation of the tympanic membrane when the earpiece wearer speaks. The flexible tubes may be composed of a silicone or like material. Retaining structure 50 works to maintain the tube end ports away from the wall of the auditory canal thereby dampening sound vibration by bone conduction.

Inbound tube 53 and outbound tube 54 extend along canal extension 47 through sound attenuating chamber 44 and outwardly to a microphone module (not shown) as disclosed in the earlier embodiments. Inner sound attenuating chamber 44 is filled with additional sound dampening material to preclude the entry of external sound into the external auditory canal. Additionally, the filler dampening material is chosen to enhance the elimination of audio vibration pickup of sound by flexible tubes 53 and 54 extending through chamber 44. In this embodiment, chamber 44 is filled with high noise attenuating fibers.

Figure 5:
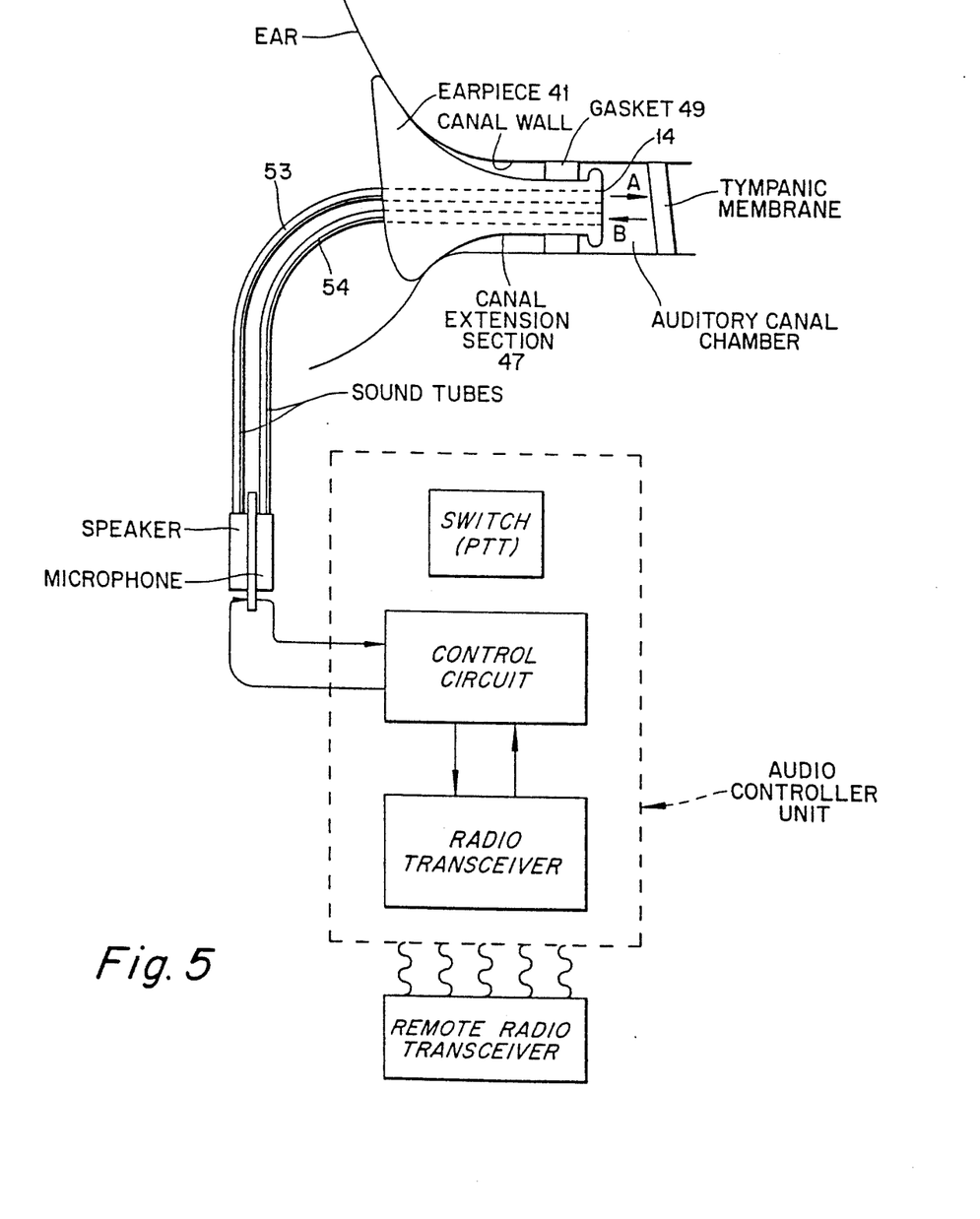
FIG. 5 is a schematic flow diagram showing the functioning portions of the voice transmission system in accordance with this invention.

Annular gasket 49 compresses substantially totally to seal around the inner wall of the auditory canal and extension section surface 48 to provide a canal air chamber within which voice sounds move from the tympanic membrane into outbound tube 54. Sound moves freely toward the tympanic membrane through the canal air chamber as schematically shown in FIG. 5 (Arrow A—inbound; Arrow B—outbound). Here the overall disposition of the earpiece assembly and audio controller unit is shown in relationship to the earpiece wearer.

The earpiece structure of the embodiments in FIGS. 1 through 3 is effective to provide a clear voice transmission within a high ambient noise environment wherein the noise level is greater than 90 decibels and up to about 100 decibels. Whenever the noise level reaches about 100 decibels, it has been found that the assembly, generally designated 55 in FIG. 4, achieves the unexpected results in attaining a clear voice transmission up to a noise level in the range of from about 120 to about 125 decibels or higher. Such operable voice transmission has never before been achieved at these ambient noise levels.

Figure 4:
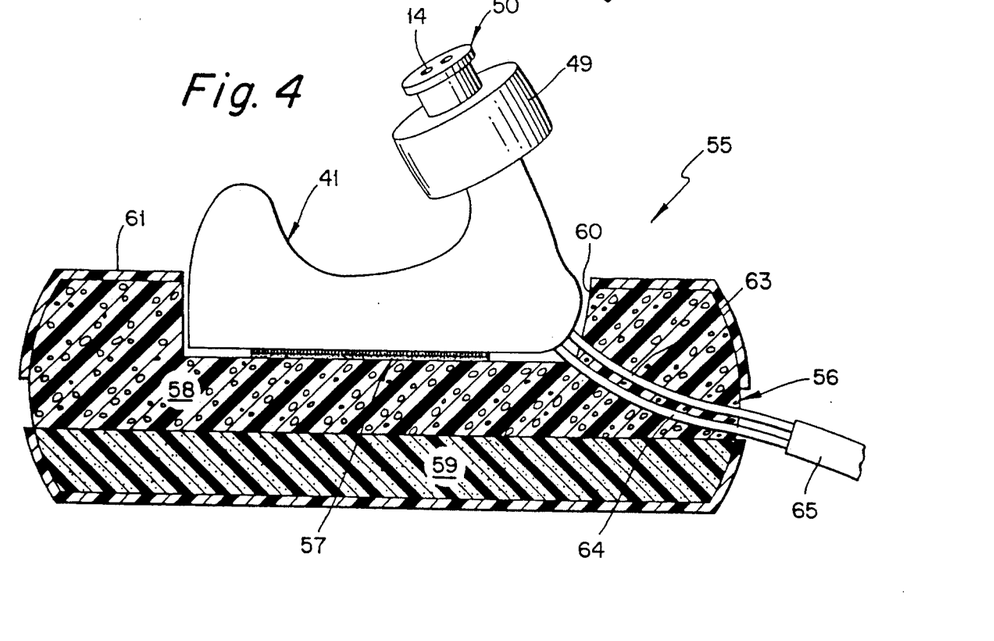
FIG. 4 is an elevational view, partially in section, of an earpiece assembly in accordance with this invention.

In the embodiment of FIG. 4, a sound dampening section 56 is removably mounted to the sound transmitting section 41 using coupling means 57 which is a Velcro connecting mechanism. Alternatively, earpiece element 41 may be permanently secured to sound dampening section 56 where its continuous use is in an extremely high noise level environment.

Sound dampening section 56 includes an external sound barrier portion 59 contiguous to an ear sealing surface portion 58. Sound dampening section 56 includes a surface recess 60 having a shape and size sufficient to receive sound transmitting element 41 as shown. Coupling means 57 is disclosed in recess 60 for removably mounting sound transmitting element 41 to sound dampening section 56. Inner sealing membrane 61 is composed of polyethylene and disposed on sealing surface portion 58 where it acts as a sealing surface membrane. Sealing surface portion 58 is composed of conformable material comprising an open-cell polyurethane foam.

Sealing surface portion 58 contiguously interlocks with the structure of the outer ear auricle with inner sealing membrane 61 being effective to block the inflow of external noise to the auditory canal air chamber. Barrier portion 59 is composed of a more rigid barrier foam such as a closed-cell polyurethane foam covered by a surface barrier layer or membrane 62. Barrier portion 59 is designed to prohibit the inbound movement of external noises to the canal air chamber. Cover tube 65 is disposed around tubes 63 and 64 extending outwardly from the sound transmitting element 41 to the speaker/microphone module (not shown) in this embodiment. A similar cover tube is found around the sound passageway tubes of the earlier described embodiments.

The schematic flow diagram of FIG. 5 illustrates the voice transmission system which unexpectedly achieves clear or substantially noise free voice transmission via the outer ear canal within high ambient noise conditions at noise levels in excess of about 90 decibels. Earpiece 41 has a structural configuration which interlocks to the outer ear auricle of the wearer. Extension section 47 projects outwardly from the body portion into the auditory ear canal at a spaced distance from the wall of the auditory canal. The end ports are spaced at a distance of about one quarter ($\frac{1}{4}$) of an inch or less from the tympanic membrane.

The annular gasket 49 around extension section 47 seals the canal air space between the end of extension section 47 and the tympanic membrane. Due to the structural configuration of earpiece 41 and gasket 49 around extension section 47, audio vibrations being conducted by the bone and tissue of the earpiece wearer is substantially eliminated. The assembly of the invention substantially exclusively obtains voice sound from the sealed canal air space into an end port of the outbound tube connected to the inlet sound port of the microphone. When the person wearing the earpiece speaks, reverse modulation of the tympanic membrane causes voice sounds to flow outwardly (Arrow B). The microphone converts voice sound to electrical voice signals directed to an audio controller unit which includes control circuitry. A push-to-talk (PTT) switch mechanism switches between outbound audio circuit means and inbound audio circuit means of the control circuitry.

In this specific embodiment when a button is pushed by the earpiece user, his voice sound travels outbound from the tympanic membrane through the microphone into the audio controller unit. Upon release of the switch button, the outbound tube is closed and the inbound tube is opened. Inbound electrical sound signals are converted by speaker means into sounds which travel through the earpiece and the enclosed canal air chamber to the tympanic membrane. Such sound transmission is accomplished via the earpiece of the invention which substantially eliminates audio vibration pickup of sound via bone and tissue conduction.

The switch mechanism may also be constructed as a voice activated system. Whenever the earpiece user speaks, the electrical voice signals from the microphone in the speaker/microphone module automatically activates the outbound audio circuit and allows the desired outbound voice transmission.

Once the electrical voice signal passes through the control circuitry it is directed to a radio transceiver which then puts out an appropriate signal that is picked up by a second radio transceiver remote from the location of the first radio transceiver unit. The first transceiver unit incorporates the audio control circuit and is disposed in a unit which may be worn on the belt of the earpiece user.

The remote radio transceiver may be electrically connected to a loud speaker or to another earpiece assembly made in accordance with this invention at the remote location. Alternatively, a hard wire connection between the first and second transceiver units may be used to effect two-way communication within high ambient noise levels in a range of up to 120 to 125 decibels.

Figure 6:
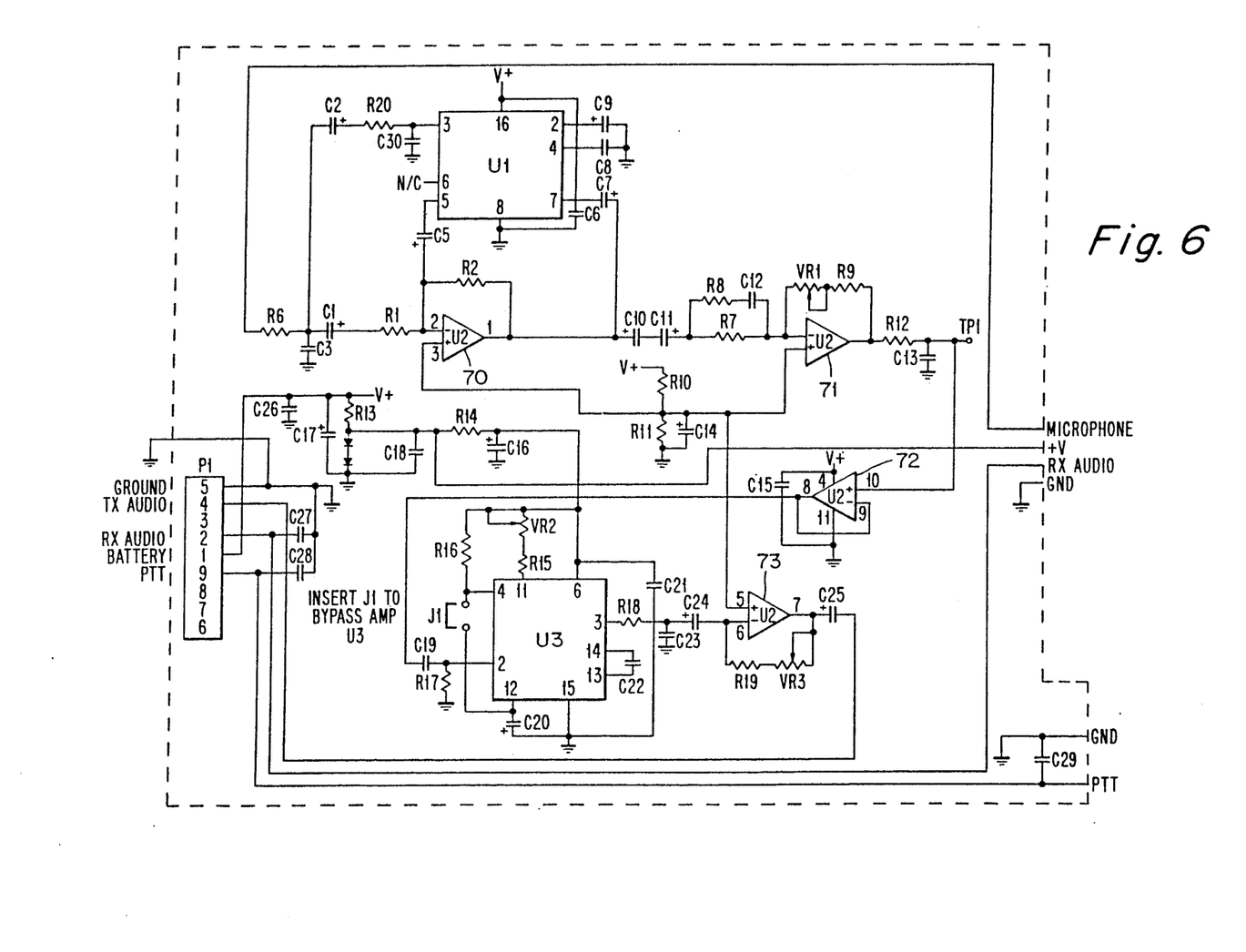
FIG. 6 is a circuit diagram showing the control circuitry in accordance with this invention.

Typical voice grade quality of this invention gives a response of between 300 and 3000 cycles per second. The control circuit as shown in FIG. 5 includes an outbound audio circuit portion designated "microphone" and an inbound audio circuit portion designated "RX audio." The amplifier means of the invention amplifies, impedance matches and buffers the outbound audio electrical signals. The output of the ear microphone is coupled to a variable input compression amplifier U1 via capacitors C1 and C2 which remove all sound in the frequency range of below about 500–600 cycles per second. Operational amplifier 70 handles feedback and works in concert with compression amplifier U1 which amplifies the electrical signal to a preselected fixed gain. The output 7 of compression amplifier U1 is capacitively coupled to the input of operation amplifier 71 where it is further amplified. That is, the predetermined gain level is preselected and set to a second stage gain level via variable resistor VR1. Operational amplifier 71 is coupled to a third stage operational amplifier 72 where the outbound audio signal is buffered so that any variations in the first two stages will not adversely affect input of processor U3 at connection 2 thereof.

Processor U3 actively separates or filters the noise portion of the electrical voice signal from the voice portion thereof using the rate of change of frequency to identify voice signals and attenuate noise audio signals not identified as voice. The noise portion of the audio signal is directed to ground.

The output of processor U3 is then directed to a fourth stage operational amplifier 73 where the signal is applied as set by potentiometer VR3 and capacitively coupled to the output of the transmit audio board at pin 4 of connection P1. Operational amplifier 73 buffers against variations in radio transmission. Power is supplied to the transmit audio board from a direct current supply to pin 1 and is divided, decoupled, filtered and regulated by the circuitry in series with pin 1 (between C26 and C16 on the circuit diagram).

The transmitter is actuated by a push-to-talk (PTT) switch which leaves the transmit audio board at pin 9 of connector P1 after being radio frequency (RF) decoupled and provides closure to ground. Radio receive (RX audio) is routed to the earpiece after being RF decoupled via C27 upon entering the transmit audio board at P2 of connector P1. The inbound circuit means includes RX audio at pin 2 and routed to RX audio at the other side of the circuit where it is electrically connected to the speaker means for sending inbound sounds to the tympanic membrane through an inbound flexible tube to the sealed canal air space.

NOISE CANCELLATION SYSTEM

Figure 7:
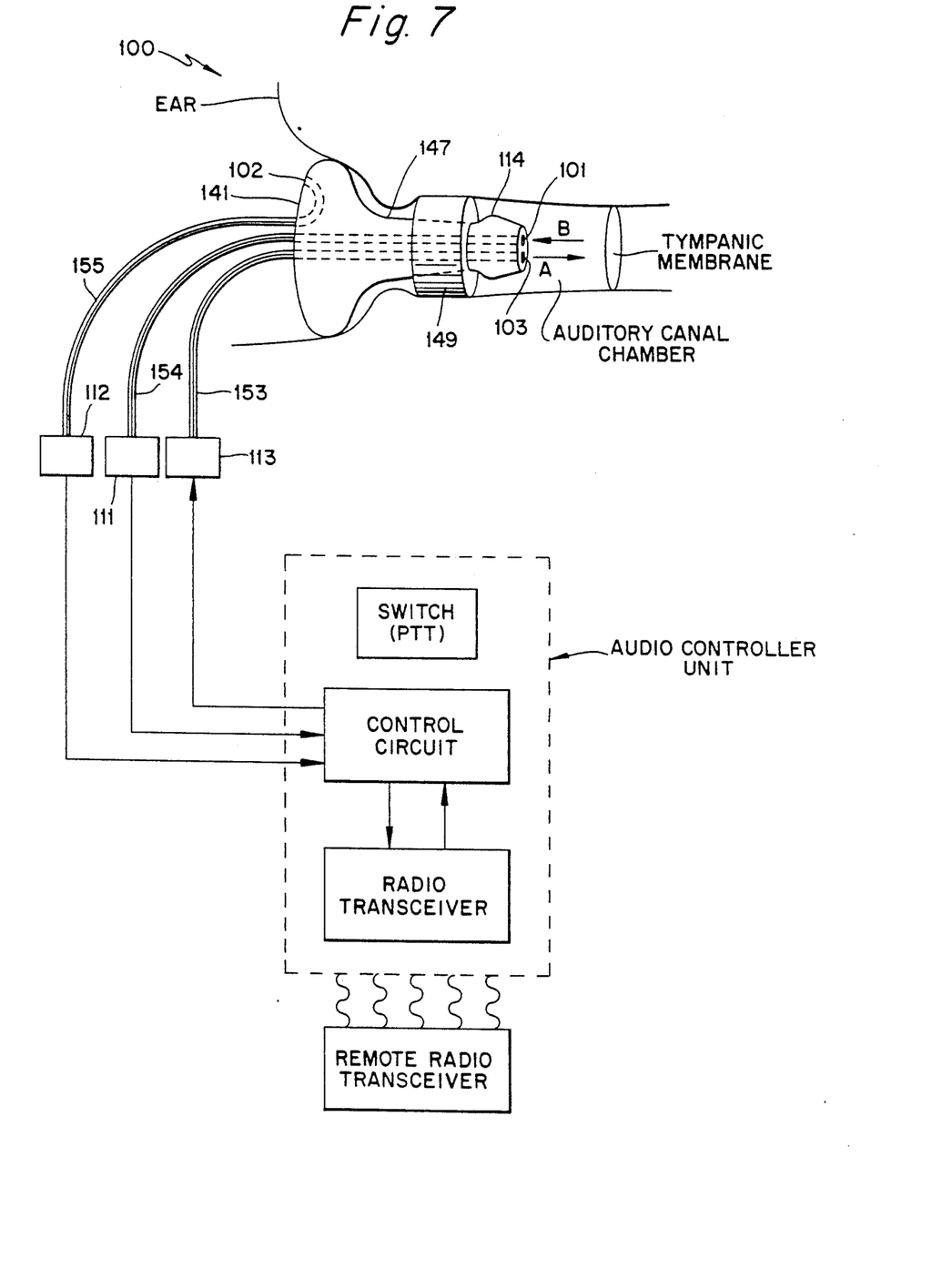
FIG. 7 is a schematic flow diagram showing a noise cancellation system in a voice transmission assembly according to the invention.

FIG. 7 shows the voice transmission system 100 with a noise cancellation modification that incorporates a 180 degree phase and frequency opposing principle for substantially eliminating the noise component from the ear canal signal. Earpiece 141 has a structural configuration that interlocks to the outer ear auricle of the wearer. Extension section 147 projects outwardly from the body portion into the auditory ear canal at a spaced distance from the wall of the auditory canal. The end ports are spaced at a distance of about one quarter ($\frac{1}{4}$) of an inch or less from the tympanic membrane.

The annular gasket 149 disposed around extension section 147 seals the canal air space between the end of extension section 147 and the tympanic membrane. As in the earlier embodiment of FIG. 5, the structural configuration of earpiece 141 and gasket 149 around extension section 147 substantially eliminates audio vibrations conducted by the bone and tissue of the earpiece wearer.

This assembly of the invention operates in substantially the same manner as the earlier embodiment of FIG. 5 with the additional use of an outside ambient noise pickup port 102. Pickup port 101 sample outside noise. Tubing 155 directs the ambient noise to microphone 122, which converts air pressure to an electrical signal that is sent to the control circuit via a hard wire connection. The control circuit processes the two electrical signals from microphones 111 and 112 for cancellation of the noise component of the voice sound audio picked up by port 101.

As in the earlier embodiment of FIG. 5, the earpiece user pushes a button to have his voice sound travel outbound from the tympanic membrane through the port 101 to microphone 111 into the audio controller unit as an electric signal. Upon release of the switch button, the outbound tube 154 is closed and the inbound tube 153 is opened. A voice actuation system may be used instead of the button to eliminate the need for manual activating for voice transmission. Voice actuation is particularly useful if earpieces are used in both ears of the user or for simultaneous transmission and reception of voice signals. Inbound electrical sound signals are converted by speaker 113 into sounds which travel through earpiece 141 and the enclosed canal air chamber to the tympanic membrane. A duplex system may be used in place of the single ear use disclosed herein. In a duplex system, inbound electrical sound signals are delivered to both ears by use of a second earpiece in the user's other ear. The sound transmission is effected as in the earlier embodiment.

Figure 8:
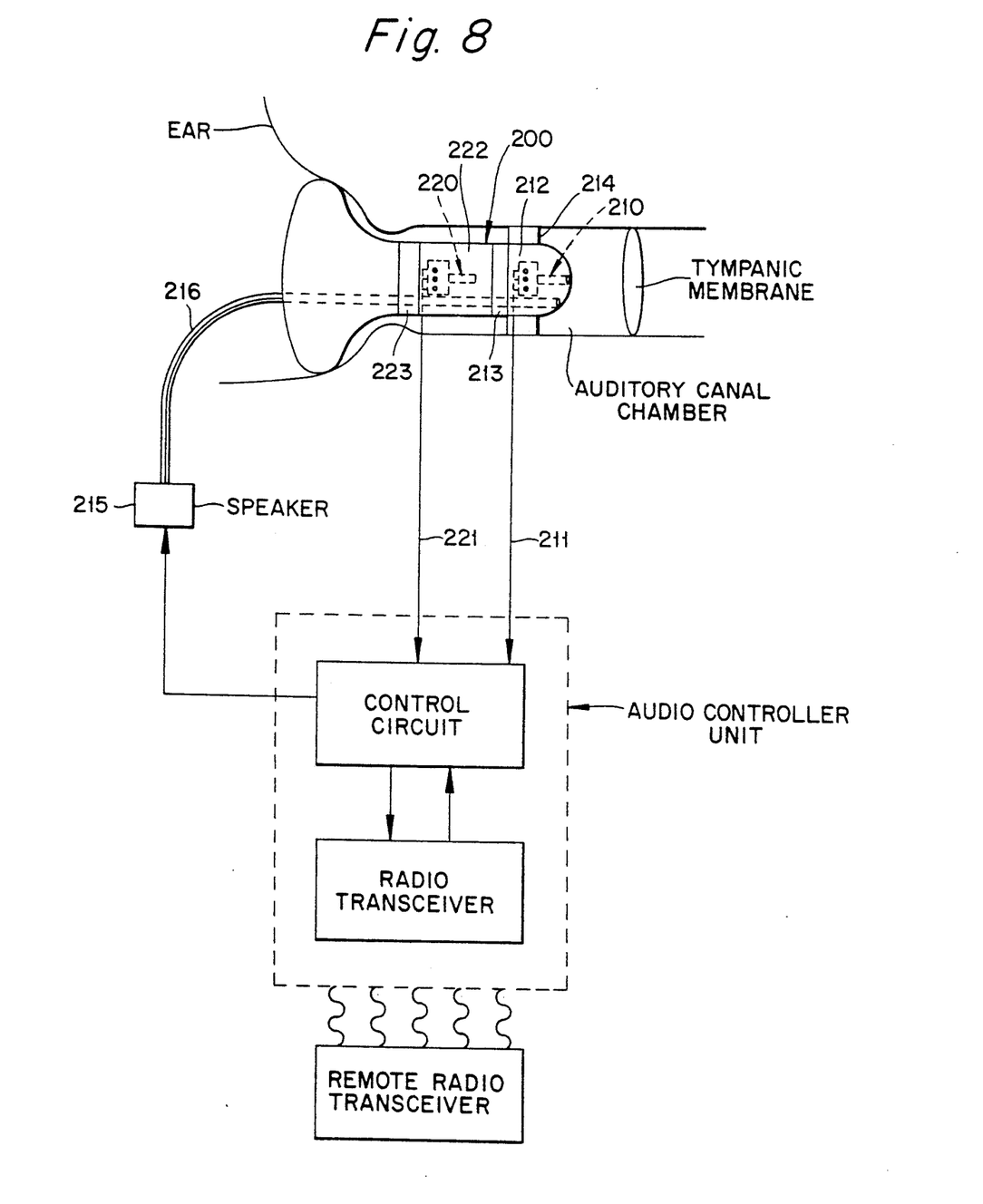
FIGS. 8 and 9 are schematic flow diagrams showing other embodiments of a noise cancellation system according to the invention.
Figure 9:
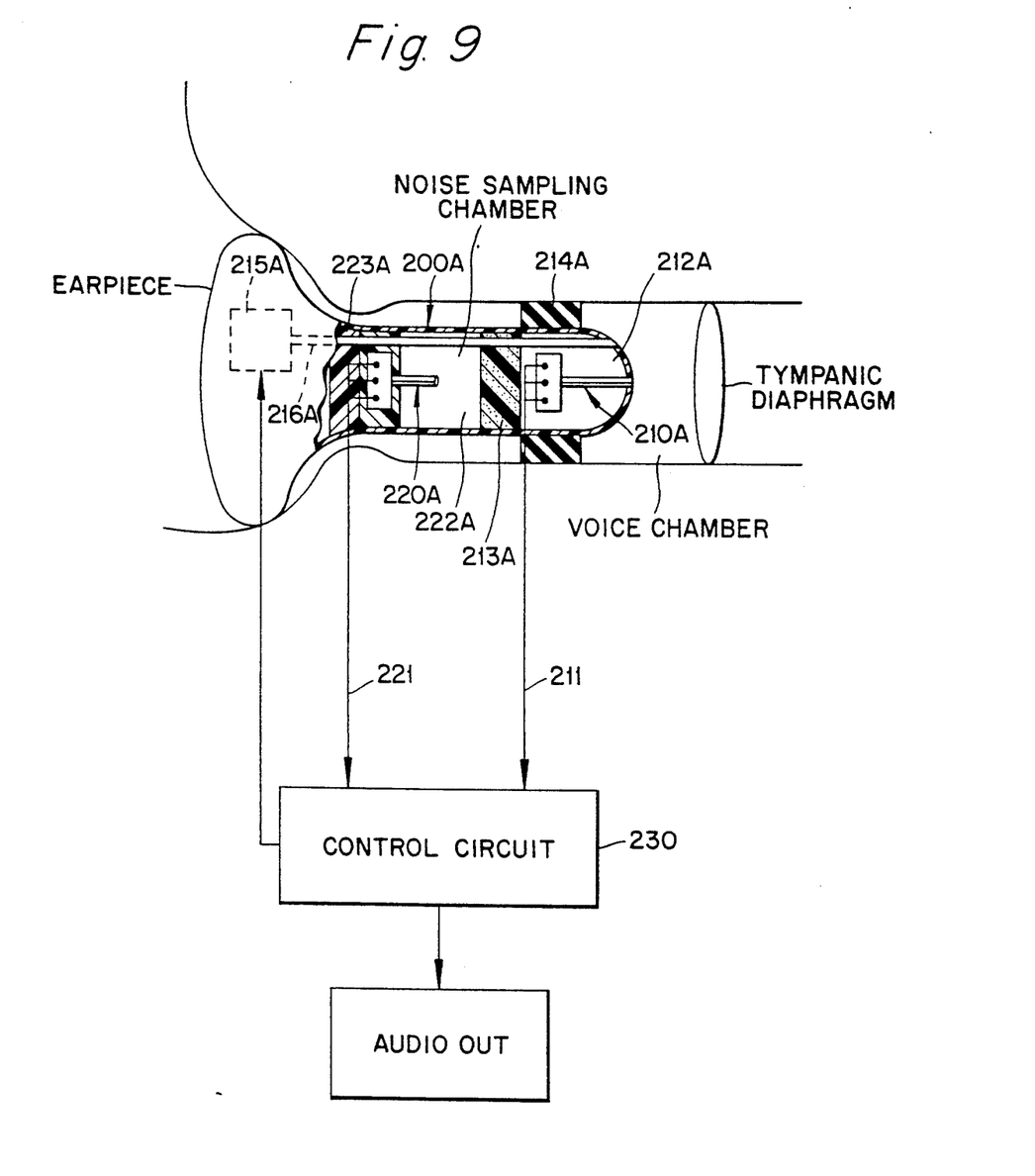

The control circuit of FIGS. 8 and 9 produces an amplitude and phase equalization of the voice sound electrical signal and noise cancelling electrical signal transmitted from the voice chamber and noise sampling chamber, respectively.

The control circuit receives (1) a voice audio electrical signal and cancelling noise audio electrical signal, (2) opposes the inputs, and (3) rejects their common mode.

In FIG. 8, earpiece 200 is electrically connected as in earlier embodiments of FIGS. 5 and 7. FIG. 9 shows earpiece 200 electrically connected to the control circuit of the invention to develop an audio output signal for transmission by any known electrical system. FIG. 8 shows an inbound voice sound signal from speaker 215 through tube 216 disposed along the bottom of earpiece 200 into the auditory canal chamber. Speaker 215A of FIG. 9 is located within the body of the earpiece as shown. The inbound voice sound signal travels through tube 216A along the top portion of earpiece 200A in FIG. 9. Otherwise the two earpieces 200 and 200A operate in the same manner.

Explanation of the sectional view in FIG. 9, applies to corresponding parts in FIG. 8. Barrier gasket 213A sound insulates voice pickup chamber 212A from noise sampling chamber 222A. Noise sampling chamber 222A has a mixture of ambient noise and voice audio sound. Chamber 212A receives a voice sound signal that is predominantly voice with a lesser component of noise. Chamber 222A samples a noise sound that is predominantly noise with a lesser component of voice. Sound sampling ports 210A and 220A are very close together so the respective phase of each sound signal is very close.

The earpiece is designed to minimize the voice portion in chamber 222A because a noise cancelling electrical signal opposes any noise and voice components of the voice sound electrical signal developed from the voice sound obtained by port 210A. The opposing or cancelling function is performed more completely in the control circuit of FIG. 10. The extent of the voice sound signal in chamber 222A will cancel the voice sound signal of chamber 212A. Thus, the amount of the voice component in chamber 222A must be minimized.

Microphone units 210A and 220A in chambers 212A and 222A, respectively, each have a tubular air pressure intake connected to a transducer. The three connections on the sound transducers of the microphone units 210A and 220A include one for voltage, which is at about 2 volts each. The second connection is audio output. The third connection is ground or common for both the audio and the voltage.

The changes in air pressure caused by the voice and noise sound components are changed to electrical signals that are transmitted by electrical leads 211 and 221 to control circuit 230 that amplifies the opposing electrical signals and rejects the like portions existing in the electrical signals. A differential amplifier in control circuit 230 amplifies only the difference between the two signals.

More specifically, for example, the noise level in chamber 212A is 20% of the total signal with 80% being voice. The noise sampling chamber 222A is predominantly noise. A sound sample from chamber 222A is about equal to the noise portion of the voice sound signal in chamber 212A. The percentages of the noise and voice portions are based on the noise and voice levels in each sound signal. The closer the noise levels in chambers 212A and 222A, the better the device works. In other words, if the noise level in chamber 222A equals the noise level in chamber 212A, there is a perfect match and all noise is then cancelled from the voice sound electrical signal in control circuit 230.

Figure 10:
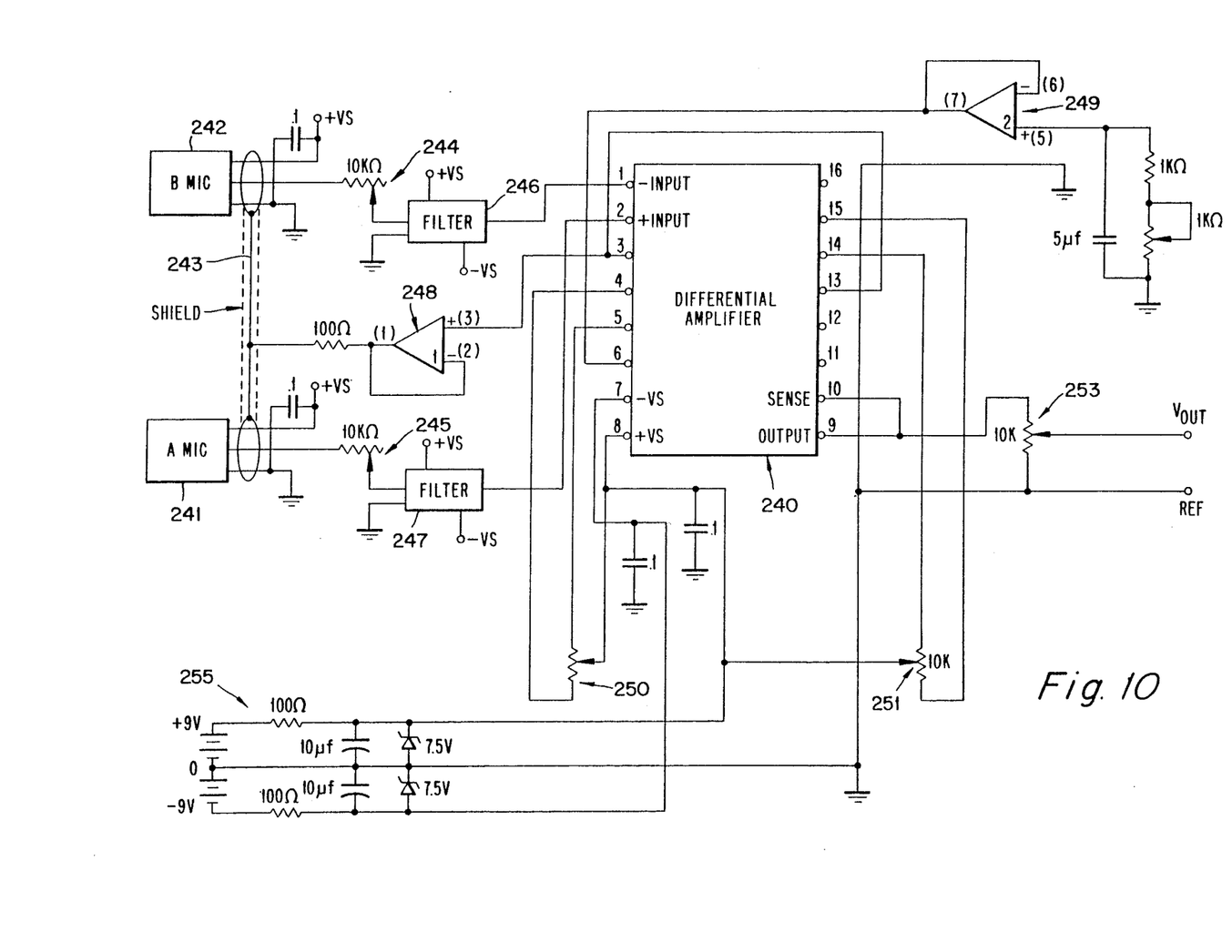
FIG. 10 is a circuit diagram showing control circuitry for a noise cancellation system of the invention.
Figure 12:
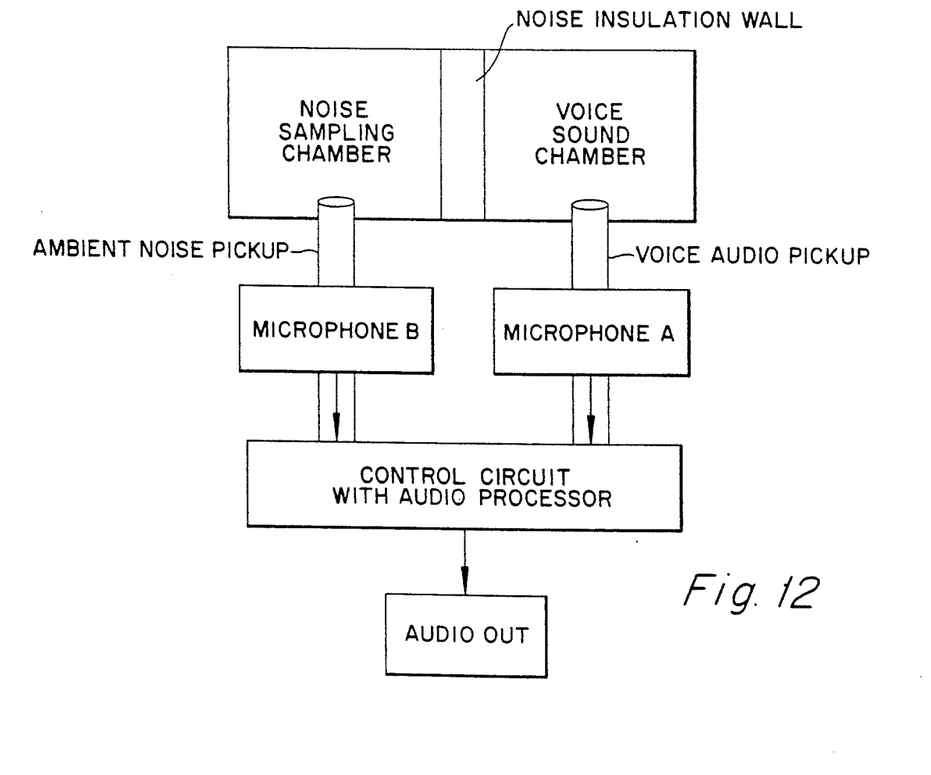
FIG. 12 is a schematic diagram of the unique ear canal noise cancellation system of the invention.

The control circuit of FIG. 10 is used to substantially eliminate the noise component from the voice sound picked up by microphone A in the voice sound chambers of the embodiments in FIGS. 7, 8 and 12. Microphone B picks up the noise cancelling sound from the noise sampling chamber. Microphones 241 and 242 are A mic and B mic, respectively.

Shield 243 keeps out any induced electromotive force (EMF) or radio frequency interference (RFI) because the system is running at low level audio. The equalization of capacitances between the wires, the conductors in the cable, and the shield contribute to preparing the signals for input to differential amplifier 240.

Operational amplifier 248 amplifies the minute fluctuations that amplifier 240 will oppose. With amplifiers 240, 248, and 249 connected as shown, if there is any stray capacitance that is induced on the shield, some of it is induced out of the conductor. Then, the circuit makes adjustment so that the audio signal will not be hampered by this fluctuation.

The inputs from microphones 241 and 242 run through a 10 K potentiometer to balance the noise levels. The value of the potentiometer could be different depending on the earpiece. The filters 246 and 247 are designed to eliminate any sound signal below 300 cycles such as motor noise. Voice grade communications is placed between 300 and 3000 cycles or Hertz.

The two electrical signals of mics A and B are directed to inputs 1 and 2 of amplifier 240 which identifies the signals and cancels the noise components on input 1 and input 2 to produce a clear voice signal at the output of amplifier 240. Amplifier 240 takes the plus input signal and minus input signal and amplifies the difference. All common input signals are cancelled or erased. The differential is the resultant substantially noise-free voice signal.

A significant aspect of the invention is to deliver the amplitude and phase as closely as possible from voice audio port to the noise sampling port of the electrical sound signals of the earpiece. The more closely the phase and amplitude are aligned, the better is the equalizing of the two signals. The method includes setting up the appropriate insulation between chamber A and chamber B. The insulation blocks 213A and 223A effect primary equalization of the sound signals within the earpiece. Further equalization is effected electrically between the mics A and B as shown in the circuit diagram of FIG. 10.

The electrical sound signals are in the range of about 2 to about 10 millivolts in the voice sound chamber. See FIG. 11. The noise component is about 2 millivolts if the total voice sound chamber is about 10 millivolts. The earpiece is made to recreate about two millivolts of noise in the noise sampling chamber to oppose the noise component in the voice sound signal at about 10 millivolts obtained in the voice or auditory chamber.

The power supply includes two nine volt batteries. With the 7.5 volt Zener diodes and capacitors, the respective voltages are balanced to regulate the supply voltage at 7.5 volts. Amplifier 240 produces a grain of 10 at pin 13 for the signal from operational amplifier 248. Amplifier 240 also matches and balances the two signals for effecting the desired noise cancellation. Potentiometers 250 and 251 are connected to null inputs and outputs to enhance signal balancing. Potentiometer 253 controls the output signal for transmission after noise is cancelled from the voice sound signal.

Figure 11:
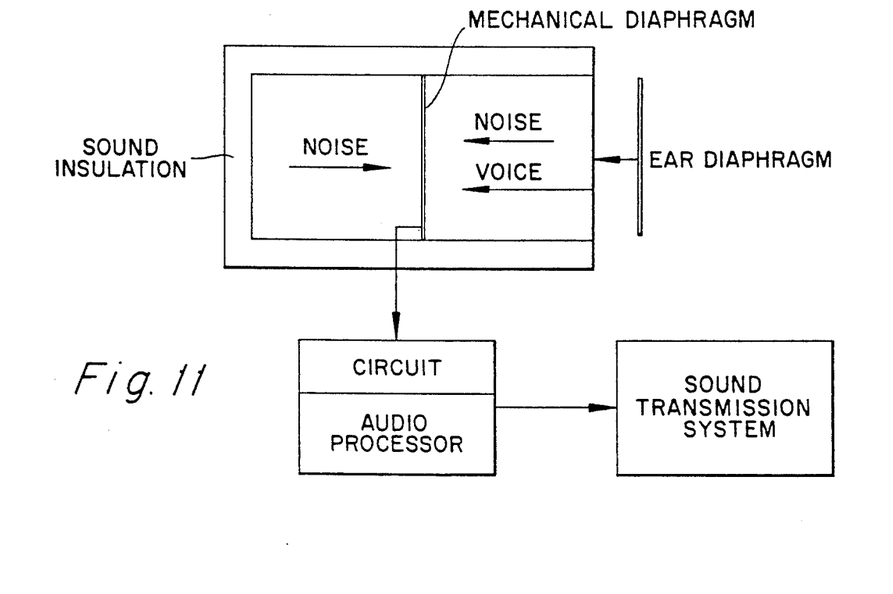
FIG. 11 is a schematic diagram of mechanical noise cancellation system for the earpiece of the invention.

FIG. 11 shows another embodiment of the noise cancellation system having a mechanical diaphragm that separates two sound chambers in an earpiece projection disposed within the ear canal. The mechanical diaphragm literally cancels the noise components within the earpiece. Thus, only the voice sound is transmitted to an electrical amplifier circuit. The mechanical diaphragm may be made of Mylar or polypropylene and is impervious to air. The very thin membranes are pressure sensitive to minute changes in pressure.

The idea is that the membrane or diaphragm holds still by virtue of equal pressure created by noise on each side. Variable or differential pressure is caused by the voice, which pushes against the diaphragm and modulates it as voice.

A piezo transducer material might be used to transmit an electrical signal based on a difference of potential. When bent, the piezo material produces a variance in voltage, i.e., fluctuation in voltage from one end of the material to the other. This material needs no battery to record a change voltage. With this embodiment, the noise cancellation is mechanical rather than electrical. Therefore, the control circuit will just amplify and filter out desired portions such as the lower 300 cycles. In this mechanical embodiment, adjustments to amplitude and phase are unnecessary.

While the voice transmission system and method for high ambient noise conditions have been shown and described in detail, it is obvious that this invention is not to be considered as limited to the exact form disclosed, and that changes in detail and construction may be made therein within the scope of the invention without departing from the spirit thereof.

Having thus set forth and disclosed the nature of this invention, what is claimed is:

1. A control circuit for a voice transmission system including an earpiece member having a structural configuration with an outer surface effective to removably interlock contiguously to the outer ear auricle of a wearer of the earpiece member, said earpiece member including a canal extension with means for receiving outbound voice sounds within the ear canal and means for sending inbound sounds to the ear canal, said circuit comprising:
    a) outbound audio circuit means, inbound audio circuit means and switch means for alternately activating the outbound audio circuit means and inbound audio circuit means,
    b) the outbound audio circuit means being effective to receive outbound electrical voice signals from first microphone means which picks up outgoing voice sounds from said means for receiving outbound voice sounds produced by reverse modulation of the tympanic membrane and obtained from the air within the external auditory canal of a person,
    c) the inbound audio circuit means being effective to send inbound electrical sound signals from second microphone means to first speaker means which sends sounds into the external auditory canal to said tympanic membrane through said means for sending inbound sounds,
    d) the outbound audio circuit means including amplifier means and processor means,
    e) said amplifier means being effective to amplify intelligible said electrical voice signals said to a preselected fixed level output gain for producing increased gain audio signals each having a voice portion and a noise portion,
    f) said processor means being effective to separate the noise portion from the voice portion for producing a clear voice sound to be transmitted by second speaker means disposed at a location remote from said person.

2. A control circuit as defined in claim 1 wherein said amplifier means includes buffer means to produce a balanced impedance in the outbound electrical voice signals before entering the processor means.

3. A control circuit for a voice transmission system, said circuit comprising:
    a) outbound audio circuit means, inbound audio circuit means and switch means for alternately activating the outbound audio circuit means and inbound audio circuit means,
    b) the outbound audio circuit means being effective to receive electrical voice signals from first microphone means which picks up outgoing voice sounds produced by reverse modulation of the tympanic membrane and obtained from the air within the external auditory canal of a person,
    c) the inbound audio circuit means being effective to send inbound electrical sound signals from second microphone means to first speaker means which sends sounds into the external auditory canal to said tympanic membrane,
    d) the outbound audio circuit means including amplifier means and processor means,
    e) said amplifier means being effective to amplify intelligible said electrical voice signals to a preselected fixed level output gain for producing increased gain audio signals each having a voice portion and a noise portion,
    f) said processor means being effective to separate the noise portion from the voice portion for producing a clear voice sound to be transmitted by second speaker means disposed at a location remote from said person,
    g) said outbound audio circuit means further includes capacitive means for removing a preselected lower frequency portion from the outbound electrical voice signals before entering said amplifier means.

4. A control circuit for a voice transmission system, said circuit comprising:
    a) outbound audio circuit means, inbound audio circuit means and switch means for alternately activating the outbound audio circuit means and inbound audio circuit means,
    b) the outbound audio circuit means being effective to receive electrical voice signals from first microphone means which picks up outgoing voice sounds produced by reverse modulation of the tympanic membrane and obtained from the air within the external auditory canal of a person,
    c) the inbound audio circuit means being effective to send inbound electrical sound signals from second microphone means to first speaker means which sends sounds into the external auditory canal to said tympanic membrane,
    d) the outbound audio circuit means including amplifier means and processor means,
    e) said amplifier means being effective to amplify intelligible said electrical voice signal to a preselected fixed level output gain for producing increased gain audio signals each having a voice portion and a noise portion, f) said processor means being effective to separate the noise portion from the voice portion for producing a clear voice sound to be transmitted by second speaker means disposed at a location remote from said person, g) said processor means further includes a comparator for directing a faster rate of change of frequency of an electrical voice signal from said voice portion to the second speaker means and directing a slower rate of change of frequency of an electrical noise from said noise portion signal to ground.

5. A method of transmitting voice sound from within an ear canal, said method comprising:
a) locating a voice sound sensing means at a first location and sensing voice sound at the first location within said ear canal,
b) said voice sound having a voice component and a noise component,
c) sensing a noise sound sample at a second location spaced from said first location,
d) opposing the voice sound with the noise sound sample to substantially eliminate the noise component from the noise sound thereby producing a resultant substantially noise free voice sound, and
e) transmitting the resultant noise free voice sound to a third location.

6. A method as defined in claim 5 wherein
said step of sensing voice sound includes disposing a mechanical diaphragm within the ear canal to define a noise sampling chamber on one side thereof and a voice sound chamber on the other side thereof,
sensing the pressure difference between noise pressure in the noise sampling chamber and sound pressure in the voice sound chamber, and
transmitting said pressure difference to an audio signal output.

7. A method as defined in claim 5 wherein
the second location is within the ear canal and is sound insulated from said first location.

8. A method as defined in claim 5 wherein
the step of sensing voice sound includes converting the voice sound into an electrical voice sound signal,
the step of sensing a noise sound sample includes converting the noise sound sample into an electrical noise sound signal, and
the step of opposing the voice sound with the noise sound sample includes electrically opposing the electrical voice sound signal with the electrical noise sound signal to produce a resultant electrical substantially noise-free voice sound signal.

9. A method as defined in claim 8 wherein
the step of converting the voice sound takes place within the ear canal.

10. A method as defined in claim 9 wherein
the step of converting the noise sound sample takes place within the ear canal.

11. A method as defined in claim 5 wherein
the second location at which the noise sound is sampled is within the ear canal and sound insulated from said first location,
said sensing steps includes a sound converting step, said comprising converting the voice sound and noise sound sample into respective electrical voice sound and noise sound signals, and electrically opposing the electrical voice sound and noise sound signals to substantially eliminate the noise component from the voice sound signal.

12. A method as defined in claim 11 wherein
said sound converting step is effected at a location outside the ear canal.

13. An earpiece assembly comprising:
a) an earpiece projection having a structural configuration effective for disposition within an ear canal of a person wearing the assembly,
b) said earpiece projection including first sound receiving means for picking up within a voice sound chamber in said ear canal voice sounds produced by the tympanic membrane of said person, insulation means disposed adjacent the voice sound chamber to define a noise sampling chamber within the ear canal, and second sound receiving means for picking up noise sample sounds within the noise sampling chamber,
c) transducer means for converting the voice sounds and noise sample sounds into respective electrical voice sound signals and noise sample sound signals,
d) said electrical voice sound signals having a noise portion and a sound portion,
e) circuit means for receiving the electrical voice sound signals and noise sample sound signals to produce a resultant differential voice signal having said noise portion substantially effectively removed, and
f) means for transmitting said resultant differential voice signal to another location remote from said assembly.

14. An assembly as defined in claim 13 wherein
the transducer means is located within the earpiece projection.

15. An assembly as defined in claim 13 wherein
the transducer means is located outside the earpiece projection, and
said first and second sound receiving means include tubing means for carrying sound from the earpiece projection to said transducer means.

16. An assembly as defined in claim 13 wherein
said earpiece projection further includes means for directing inbound voice sounds into the ear canal through the earpiece projection to the tympanic membrane thereby enabling two-way sound communication within the ear canal.

17. In a voice transmission system having an earpiece for effecting two-way communication within the ear canal of a person wearing the earpiece wherein the earpiece has an earpiece projection, the combination comprising:
a) first pickup means for receiving voice audio sound from within the ear canal of the earpiece wearer,
b) second pickup means for receiving a cancelling noise sound,
c) microphone means for converting the voice audio sound and the cancelling noise sound into a respective voice audio electrical signal and cancelling noise electrical signal,
d) first electrical signal processing means for equalizing the phase and amplitude of the voice audio electrical signal and the cancelling noise electrical signal, and
e) second electrical signal processing means for electrically aligning the cancelling noise electrical signal and voice audio electrical signal after being equalized to oppose each other 180 degrees out of phase thereby producing a resultant substantially noise-free voice signal, f) said microphone means is disposed in the earpiece projection having a structural configuration to fit within the ear canal of the person wearing the earpiece.

18. The combination as defined in claim 17 wherein the voice transmission system further includes sound dampening means disposed to isolate the earpiece when the earpiece is removably interlocked contiguously to the outer ear auricle of the person wearing it for thereby substantially eliminating audio vibration pickup of sound transmitted by bone and tissue conduction.

19. The combination as defined in claim 17 wherein the microphone means includes first microphone means for converting the voice audio sound into a voice audio electrical signal and second microphone means for converting the cancelling noise sound into a cancelling noise electrical signal, and the voice transmission system further includes a tubular sound carrier connected to speaker means for directing inbound sound through the earpiece to a location within the ear canal adjacent the person's tympanic membrane.

* * * * *